March 8, 1932.  M. W. McCONKEY  1,848,258

BRAKE

Filed Sept. 17, 1928

INVENTOR.
Montgomery W. McConkey

Patented Mar. 8, 1932

1,848,258

UNITED STATES PATENT OFFICE

MONTGOMERY W. McCONKEY, OF SOUTH BEND, INDIANA, ASSIGNOR TO BENDIX BRAKE COMPANY, OF SOUTH BEND, INDIANA, A CORPORATION OF ILLINOIS

BRAKE

Application filed September 17, 1928. Serial No. 306,414.

This invention relates to brakes, and is illustrated as embodied in an internal expanding brake for an automobile. An object of the invention is to provide simple locking means for the brake adjustment, preferably by utilizing a centering device which yieldingly determines the released position of the brake friction means.

In one desirable arrangement, the adjustment is locked by a lever forming in effect a locking pawl, this being especially advantageous when the adjustment is in the form of a threaded device forming a floating connection between a pair of brake shoes, and as pointed out above I prefer to utilize this lever or its equivalent to center the friction means when the brake is released, for example by forming it with wedge surfaces yieldingly embracing a part of the adjustment.

The above and other objects and features of the invention, including various novel and desirable details of construction, will be apparent from the following description of the illustrative embodiment shown in the accompanying drawings, in which.

Figure 1:
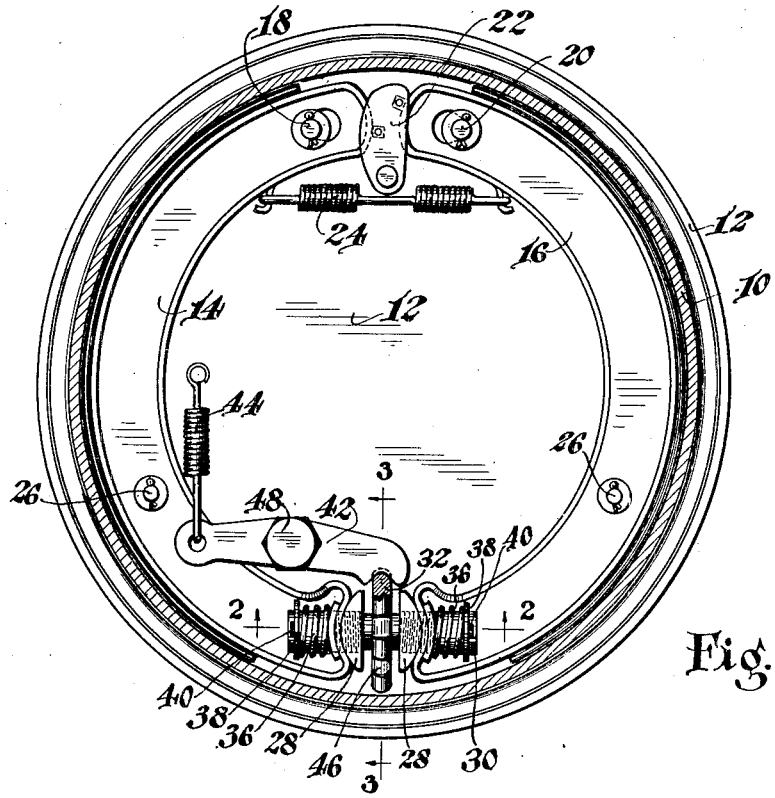
Figure 1 is a vertical section through the brake, just inside the head of the brake drum, and showing the brake shoes in side elevation.

The illustrated brake includes a rotatable drum 10, at the open side of which is a support such as a backing plate 12, and within which is arranged the friction means of the brake. This particular friction means includes a pair of floating generally L-section stamped steel shoes 14 and 16, faced with the usual friction lining and so arranged that when the drum is turning clockwise the shoe 14 anchors on a fixed post 18 carried by the backing plate, while when the drum is turning counterclockwise the shoe 16 anchors on post 20 carried by the backing plate.

The brake is applied by means such as a floating lever or cam 22, against the resistance of a return spring 24. Shoes 14 and 16 may if desired have suitable steady-rests 26.

At their lower ends, shoes 14 and 16 are formed with transverse semi-cylindrical sockets receiving correspondingly-shaped thrust blocks 28, forming part of the brake adjustment, and into which there is threaded a right-and-left threaded adjusting member 30 having an operating collar 32 at its center, this collar being formed if desired with radial sockets 34 for a nail or other tool inserted through an opening 35 in the backing plate. Coil springs 36 sleeved on the ends of member 30, and confined between the flanges forming the shoe ends and washers or the like 38 held by means such as cotter pins 40 on the ends of member 30, serve to hold the shoes and adjustment together.

Many of the details and structural features of the above-described brake are the invention of L. E. LaBrie, and are covered by his applications and patents. See, for example, application No. 285,289, filed June 14, 1928.

Figure 2:
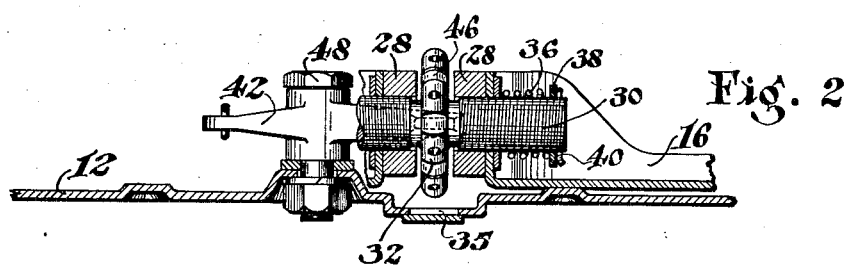
Figure 2 is a partial section, on the line 2—2 of Figure 1, through the brake adjustment.
Figure 3:
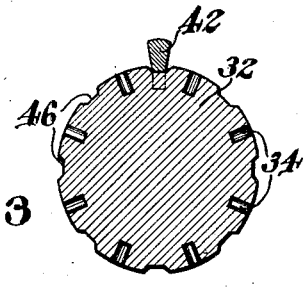
Figure 3 is a partial section, at right angles to Figure 2 and on the line 3—3 of Figure 1, through the adjustment.

According to the present invention, the adjustment is locked against unintended operation, by novel means shown as a lever 42, shown as a forged lever in Figures 1–3, urged against collar 32 by means such as a coil spring 44 tensioned between the lever and the backing plate. Collar 32 is formed with rounded notches 46, defining teeth and in effect constituting collar 32 a ratchet engaging lever 42 as a locking pawl. Thus lever 42 locks the adjustment unless sufficient force is applied to cause the rounded notches 46 to form the lever to ride over the adjacent teeth, thereby preventing unintended turning of the adjustment.

Lever 42 may be fulcrumed on a pivot 48 carried by the backing plate, and therefore does not shift with shoes 14 or 16 as they anchor against post 18 or post 20 when the brake is applied. The end engaging collar 32 is formed with double wedge surfaces embracing the collar, and serving yieldingly to center collar 32 (and therefore the lower or connected ends of the shoes) when the brake is released.

Figure 4:
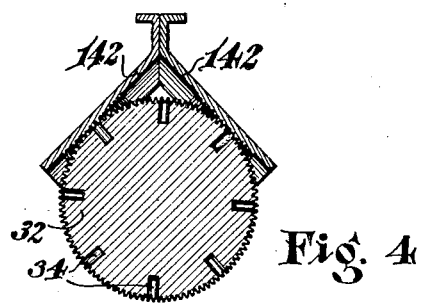
Figure 4 is a partial section corresponding to Figure 3, but showing a modified form of lever.

In Figure 4 is shown a lever constructed of two angle-section steel stampings 142 welded together back to back, and embracing collar 32 in such a manner as to confine it against lateral movement. Lever 142 and collar 32 may be serrated to form yieldingly interlocking teeth. Except for the structure shown in Figure 4, lever 142 may be the same in form and arrangement as lever 42.

While one illustrative embodiment has been described in detail, it is not my intention to limit the scope of the invention to that particular embodiment, or otherwise than by the terms of the appended claims.

I claim:

1. A brake comprising, in combination, floating friction means, an adjusting device therefor, and a centering lever for the friction means cooperating with the adjusting device to lock said device in adjusted position.

2. A brake comprising, in combination, floating friction means, an adjusting device therefor, a centering lever engaging the adjusting device, and means acting yieldingly on said lever to center the friction means when the brake is released including means to lock the adjusting device.

3. A brake comprising, in combination, friction means having two parts connected by an adjustment including a locking ratchet, and a lever acting as a pawl engaging said ratchet and also arranged to center the friction means when the brake is released.

4. A brake comprising, in combination, friction means having two parts connected by an adjustment including a locking ratchet, and a lever acting as a pawl engaging said ratchet and having wedge surfaces engaging the ratchet and yieldingly acting through the adjustment to resist brake-applying movement of the friction means.

5. A brake comprising, in combination, floating friction means having two parts connected by a floating adjustment including a locking ratchet, and a lever mounted separately from the friction means and acting as a pawl engaging said ratchet and also arranged to center the friction means when the brake is released.

6. A brake comprising, in combination, floating friction means having two parts connected by a floating adjustment including a locking ratchet, and a lever mounted separately from the friction means and acting as a pawl engaging said ratchet.

7. A brake comprising, in combination, friction means having two parts connected by an adjustment including a locking ratchet, and a lever acting as a pawl engaging said ratchet and having wedge surfaces yieldingly acting to resist brake-applying movement of the friction means.

8. A brake comprising, in combination, a drum, a pair of shoes connected by a floating adjustment and arranged to anchor on one shoe when the drum is turning in one direction and on the other shoe when the drum is turning in the other direction, and yieldingly-operated means arranged to urge the connected ends of the shoes toward their idle or brake-released positions including means for locking the adjustment.

9. A brake comprising, in combination, a drum, a backing plate, a pair of shoes connected by a floating adjustment and arranged to anchor on one shoe when the drum is turning in one direction and on the other shoe when the drum is turning in the other direction, and yieldingly-operated means carried by the backing plate and arranged to lock said adjustment and also arranged to urge the connected ends of the shoes toward their idle or brake-released positions.

10. A brake comprising, in combination, a drum, a backing plate, a pair of shoes connected by a floating adjustment and arranged to anchor on one shoe when the drum is turning in one direction and on the other shoe when the drum is turning in the other direction, and a yieldingly-operated lever pivoted on the backing plate and arranged to serve as a locking pawl for said adjustment and also arranged to urge the connected ends of the shoes toward their idle or brake-released positions.

11. A brake comprising, in combination, a drum, a backing plate, a pair of shoes connected by a floating adjustment and arranged to anchor on one shoe when the drum is turning in one direction and on the other shoe when the drum is turning in the other direction, and a yieldingly-operated lever pivoted on the backing plate and arranged to serve as a locking pawl for said adjustment.

12. A brake comprising, in combination, a drum, a backing plate, a pair of shoes connected by a floating adjustment and arranged to anchor on one shoe when the drum is turning in one direction and on the other shoe when the drum is turning in the other direction, and a yieldingly-operated lever pivoted on the backing plate and arranged to serve as a locking pawl for said adjustment and having diverging wedge surfaces embracing a part of the adjustment and urging the connected ends of the shoes toward their idle positions.

13. A brake comprising a floating adjustment including a rotatable operating part having ratchet teeth, in combination with a yieldingly-operated lever engaging said part and formed to interlock with said teeth.

14. A brake comprising a floating adjustment including a rotatable operating part having ratchet teeth, in combination with a yieldingly-operated lever engaging said part and formed to interlock with said teeth, said lever having portions engaging opposite sides of said part and restraining lateral movement of the floating adjustment.

15. A brake comprising a floating adjustment including a rotatable operating part having ratchet teeth, in combination with a yieldingly-operated forged lever engaging said part and formed to interlock with said teeth.

In testimony whereof I have hereunto signed my name.

MONTGOMERY W. McCONKEY.